US009036615B2

(12) United States Patent
Bienas et al.

(10) Patent No.: US 9,036,615 B2
(45) Date of Patent: May 19, 2015

(54) WIRELESS FEMTOCELL SETUP METHODS AND APPARATUS

(71) Applicant: Apple Inc., Cupertino, CA (US)

(72) Inventors: Maik Bienas, Braunschweig (DE); Hyung Nam Choi, Hamburg (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/053,538

(22) Filed: Oct. 14, 2013

(65) Prior Publication Data

US 2014/0038599 A1 Feb. 6, 2014

Related U.S. Application Data

(62) Division of application No. 13/506,113, filed on Mar. 26, 2012, now Pat. No. 8,559,395, which is a division of application No. 12/156,101, filed on May 28, 2008, now Pat. No. 8,144,725.

(51) Int. Cl.
| | |
|---|---|
| *H04J 1/00* | (2006.01) |
| *H04W 16/20* | (2009.01) |
| *H04W 36/30* | (2009.01) |
| *H04W 24/02* | (2009.01) |
| *H04W 24/08* | (2009.01) |
| *H04W 84/04* | (2009.01) |

(52) U.S. Cl.
CPC .............. *H04W 16/20* (2013.01); *H04W 36/30* (2013.01); *H04W 24/02* (2013.01); *H04W 24/08* (2013.01); *H04W 84/042* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 6,038,448 | A * | 3/2000 | Chheda et al. ................ | 455/436 |
| 6,542,741 | B2 * | 4/2003 | Wallstedt et al. ............. | 455/434 |
| 2004/0137927 | A1 * | 7/2004 | Mun .............................. | 455/509 |
| 2004/0152462 | A1 * | 8/2004 | Hwang ....................... | 455/432.1 |
| 2008/0299927 | A1 * | 12/2008 | Tenbrook et al. ........... | 455/226.2 |
| 2009/0129371 | A1 * | 5/2009 | Bishay .......................... | 370/352 |
| 2010/0203911 | A1 * | 8/2010 | Cordeiro et al. .............. | 455/501 |

* cited by examiner

Primary Examiner — Raj Jain
(74) Attorney, Agent, or Firm — Meyertons, Hood, Kivlin, Kowert & Goetzel, P.C.

(57) ABSTRACT

Methods and apparatus that enable a wireless femtocell to operate in its designated frequency so as to minimize interference between the wireless femtocell and neighboring base stations (and other femtocells or nomadic cells). In one exemplary embodiment, the femtocell cell comprises a UMTS (Universal Mobile Telecommunications System) femtocell which has the ability to scan the air interface in a manner similar to that associated with a UE in order to identify unallocated resources within the wireless network, and subsequently request access for the unallocated resources. Business methods useful in combination with the aforementioned methods and apparatus are also disclosed.

20 Claims, 9 Drawing Sheets

WIRELESS FEMTOCELL SETUP METHODS AND APPARATUS

PRIORITY

This application is a divisional of and claims the benefit of priority from U.S. patent application Ser. No. 13/506,113, entitled "Wireless Femtocell Setup Methods and Apparatus" and filed Mar. 26, 2012 (issuing on Oct. 15, 2013 as U.S. Pat. No. 8,559,395), which is a divisional of and claims the benefit of priority from U.S. patent application Ser. No. 12/156,101, entitled "Wireless Femtocell Setup Methods and Apparatus: and filed May 28, 2008 (issued as U.S. Pat. No. 8,144,725 on Mar. 27, 2012), both of which are fully incorporated herein by reference for all purposes.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to the implementation of a femtocell radio frequency setup procedure so as to minimize interference between other femtocells and/or base stations of the primary network operator.

2. Background of Related Technology

The deployment of additional base stations in a wireless network is a considerable capital expenditure for network operators. One proposed method of defraying the cost to a service provider is via user-initiated deployment of small cellular base stations, which are commonly referred to as "femtocells". The intended mode of operation for a femtocell is to augment the service provider's existing network of base stations by connecting to the service provider's network via a broadband interface (such as DSL or cable). Due to the smaller size and cost of a femtocell, they can be distributed in areas which are otherwise not feasibly serviced through standard base station deployment (e.g., by extension of indoor service coverage, or temporary service coverage).

Femtocells are far cheaper to manufacture than a typical base station, and possess simpler software. Femtocells are also typically not fully featured, and cannot support the same number of users as a typical base station. Furthermore, femtocells offer complete and self-contained deployment. The relative cost and simplicity of operation allows a non-technical audience (i.e., residential and small business users) to purchase and operate femtocells. The benefits of femtocell deployment are shared between the user and the network. For a user, as mentioned above, the femtocell offers an inexpensive and easy method to selectively augment network coverage. Another distinct advantage of femtocells over other user managed ad hoc networks is their seamless integration with current network base stations, as opposed to the expensive hardware and software costs necessary for multi-mode capable transceivers.

Universal Mobile Telecommunications System (UMTS) and Femtocells

The Universal Mobile Telecommunications System (UMTS) is an exemplary implementation of a "third-generation" or "3G" cellular telephone technology. The UMTS standard is specified by a collaborative body referred to as the 3rd Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

Currently, the standardization body for mobile communication (3GPP) is specifying a new network femtocell element called a "Home Node B" (HNB). This is a modified Node B (aka, UMTS base station) designed for use in buildings, with focus on home or residential environments, in order to increase in-building coverage. For example, in one exemplary usage case, a user of a mobile phone might wish to augment their wireless coverage by implementing a HNB in their apartment. The user employs a DSL connection to connect the HNB to the operator's Core Network. The usage is beneficial for both operator and user; i.e., the user may save money, improve data throughput, and conserve battery power for his mobile phone (by improved in-house coverage) when using his HNB. The operator gets additional network coverage area; see, e.g., 3GPP TR 25.820, "3G Home Node B Study Item Technical Report" v100 (Release 8), which is incorporated herein by reference in its entirety.

Flexibility of use is one important requirement for HNB operation. An HNB should be easy to use, and easily transportable, so that it can be used nomadically; e.g., the user may operate it one day in his apartment, and the next day on a business trip in a hotel. Additionally the HNB may be switched on and off unpredictably; an example of such erratic usage would be a user who does not operate the HNB at night while he/she is asleep.

The simplicity of HNB operation, and convenience of setup for the home user, also creates some unique challenges for network operators. Prior to the deployment of femtocells, base station networks were planned and deployed by a network operator, and were relatively static in nature. Physical network resources were also planned in advance by the base station operator. Network access functions such as security and authorization were easily controlled by a network operator through the base station fixtures as well. The nomadic usage of HNBs has significantly complicated these fixed base station network operations.

One such example of increased network complexity is the allocation of spectrum resources. Spectrum allocation is a major implementation issue for carrier networks. A typical Node B installation is running permanently at a fixed location. Based on its fixed geography, the operator allocates different radio resources (i.e., carrier frequencies or codes) to neighboring Node Bs. The neighboring Node Bs' geographic locations and distances are fixed; therefore radio frequency (RF) interference is minimized. Careful network planning is necessary, otherwise different UEs (User Equipment) connected to neighboring Node Bs may mutually interfere, and valuable spectrum resources inefficiently utilized, thereby imposing costs on the operators of these networks.

Several solutions have been contemplated in the prior art to address the issue of network radio frequency spectrum allocation including frequency detection, spectrum occupation (also referred to as free or usable), and spectrum selection. For example, U.S. Pat. No. 5,963,848 to D'Avello issued Oct.

5, 1999 and entitled "Method and apparatus for assigning a channel to a mobile unit in a wireless communication system" discloses a method and apparatus which determines which channels in a wireless communication system are both authorized for cordless operation and available. A channel is then selectively chosen from this list to reduce the probability that an interferer will be on the chosen channel. For example, the channel could be randomly selected from all available channels or randomly selected from a limited group of available channels to avoid co-channel interference. Alternatively, the channel could be chosen based upon the level of the signal that last caused that channel to be blocked. Finally, the channel could be chosen based upon the number of channels from an available channel to the nearest blocked channel.

United States Publication No. 20040235428 to Nagai et al. published Nov. 25, 2004 and entitled "Communication system, and endpoint device and interrogator" discloses a communication system wherein each endpoint device which has received an interrogating signal from an interrogator responds with a reflected signal generated by modulating the interrogating signal with appropriate information. Each endpoint device includes a distance detecting portion operable to detect a distance between the interrogator and the endpoint device; a reflecting portion operable to receive and reflect the interrogating signal; an information generating portion operable to generate replying information to be transmitted to the interrogator; a band determining portion operable to determine on the basis of the detected distance a frequency band of a modulating signal used to modulate a reflected signal generated by the reflecting portion; and a modulating-signal generating portion operable, according to the replying information, to generate the modulating signal having a frequency within the determined frequency band. The distance detecting portion may be provided in the interrogator, rather than in the endpoint device. The frequency of the modulating signal may be determined on the basis of the number of the endpoint devices ready for communication with the interrogator, or a distribution of overall frequency utilization ratio of the reflected signals received from the individual endpoint devices.

United States Patent Publication No. 20060294573 to Rogers et al. published Dec. 28, 2006 and entitled "Media distribution system" discloses a system, apparatus, method and article to distribute media information. The apparatus may include a transceiver to receive digital information representing media information. The apparatus may further include a processor to couple to the transceiver, the processor to select a modulation technique based on a receiver type and an ultra-high frequency channel using a cognitive algorithm. The transceiver may transmit the media information over the channel using the modulation technique.

German Publication No. DE4104890 to Dipling published Aug. 27, 1992 and entitled "Mobile radio telephone system—with disconnection of each battery-operated mobile station in traffic-free situation" discloses a radio telephone system that has each mobile frequency multiplex station coupled via a number of duplex speech channels with fixed stations, coupled to the telephone line network. The mobile stations exhibiting no communication traffic are cyclically disconnected and are switched back in via a time slot radio information signal transmitted by a fixed station and containing the addresses of each mobile station identified by the incoming traffic within the time slot. A quitting signal is provided for detecting the highest reception field strength to select the transmission path.

WIPO Publication No. 2003096590 to Logvinov et al. published Nov. 20, 2003 and entitled "Method and System of Channel Analysis and Carrier Selection in OFDM and Multi-Carrier Systems" discloses a method to channel estimation in OFDM systems. The embodiment of this invention is a block of new logic (16) and modifications performed to other components of the system, added to any existing OFDM receiver, which utilizes information available from other blocks as found in the receiver. This logic (16) would improve the units' error rate because of the improved channel quality estimations it makes available. This improvement is made possible because both channel noise data and channel signal data (11) are used in the estimation process. This data goes through a learning process over time and multiple data blocks for further improvements in the quality of the estimate. This improvement is possible without any direct communications with other remote units, but it could be used in a multi-node environment to improve the performance of the system as the whole.

WIPO Publication No. WO/2007/093653 published Aug. 23, 2007 to Herraiz et al., and entitled "Method and system for establishing a direct radio communication between two or more user devices in a cellular mobile communication system" discloses a method for establishing a direct radio communication between two or more user devices in a cellular mobile communication system, whereby said users are subscribed to the same operator. According to the invention, a cognitive radio technique is used to detect spectrum resources available for radio communications in a predetermined area containing said at least two user devices. The method is characterized in that it also includes the following steps in which: at least one resource is selected from the available resources, said resource being a resource of the operator common to the two or more user devices; and a direct radio link is established between said two users using the detected free resource of the operator. The invention also relates to a system for establishing a direct radio communication between two or more user devices in a cellular mobile communication system.

European Publication No. EP1248477 to Zimmerman et al. published Oct. 9, 2002 and entitled "Method and device for controlling dynamic frequency selection within a wireless communication system" discloses a method of controlling frequency selection within a wireless communication system in response to radar-like interference signals which comprises continuously or quasi-continuously monitoring and assessing one or more frequencies with respect to radar-like interference signals, allocating a quality parameter to each assessed frequency, the quality parameter indicating a probability that a frequency is occupied, and selecting one or more transmission frequencies in dependence on the allocated quality parameters. Optionally, a further monitoring of one or more frequencies with respect to at least one of the radar-like interference signals and other interference signals can be performed.

WIPO Publication No. WO2007040453 published Apr. 12, 2007 entitled "Automatic Configuration Of Pico Radio Base Station" discloses methods and apparatus to configure a femto radio base station. A macro receiver of the femto radio base station is used to acquire detected coverage information of a radio access network. The detected coverage information is used to determine an operation parameter for use by the macro transceiver of the femto radio base station. In one embodiment, the detected coverage information is transmitted to a control node of the radio access network. The control node determines the operation parameter and communicates the operation parameter to the femto radio base station. The femto radio base station is accordingly configured using the operation parameter for further operation towards UEs accessing the femto radio base station.

Other spectrum allocation schemes also exist in the prior art. For example, in the context of a wireless LAN (WLAN), WLAN Access Points scan the spectrum for electromagnetic interference and select a portion of spectrum with the lowest interference for transmission. The access point independently decides what the optimal spectral usage is, based on the used spectrum. A comparable solution is used in base stations for cordless telephones (e.g., DECT).

In addition to the above-described limitations of the prior art, standard UE operation cell selection procedures rely on the UE scanning for, and finding the strongest cell. The cell selection is performed by the UE, rather than the network. The UE informs the network about the selection and communication between the UE and the network proceeds normally. One key difference between femtocell systems and prior art resource allocation methods is that prior art mobile communication networks assume that the network controls all unused resources at a given time. This is a valid assumption when the UE selects a specific cell for the request and the occupied resources are known by the network. However, this assumption is not valid for resource allocation of a femtocell, in that the network does not know which resources are unused at the location of the femtocell when the femtocell makes a resource request. Furthermore, the network will generally not know the exact current position of the femtocell.

Therefore, despite the foregoing variety of different approaches to network resource management, none of these solutions address the additional complexity relating to spectrum allocation that occurs with arbitrary femtocell deployment. In the context of UMTS, the prior art solutions are not usable for HNBs, as HNBs will be operated in a licensed spectrum. Spectrum usage must remain under the control of the operator who owns and operates the licensed spectrum band. Therefore the allocation of spectrum resources to be used by HNBs must be performed in the Core Network and controlled by the operator. Unfortunately, the RF environment at the location of the HNB is unknown by the Core Network. Accordingly, improved methods and apparatus for efficiently assigning spectrum usage are needed.

Such methods and apparatus would ideally provide a simple control scheme for the network operator to manage spectral resources, while also maintaining ease of use and transparent operation for a non-technical user. Such improved methods and apparatus would also aim to find an unused frequency resource at the location of the HNB for transmission with UEs. Advantageously, the network would select the resource to use by the HNB, with the HNB becoming an extension of the network's base station capability.

SUMMARY OF THE INVENTION

The present invention satisfies the foregoing needs by providing, inter alia, improved methods and apparatus for implementing a femtocell within a wireless network such as e.g., a 3G/UMTS cellular network.

In a first aspect of the invention, a method of operating a cell within a wireless network is disclosed. In one embodiment, the cell comprise a network connection with a core of the network, and the method comprises: scanning the network resources to identify at least a portion of unoccupied network resources; requesting at least a portion of the unoccupied network resources from the core of the network; and occupying the at least a portion of unoccupied network resources after being granted the unoccupied resources by the core.

In one variant, the wireless network comprises a cellular network having a plurality of base stations, and the cell comprises a cell having a reduced set of capabilities as compared to that of one of the base stations. The cellular network comprises e.g., a UMTS-enabled network, and the cell comprises a femtocell.

In another variant, the act of scanning the network resources further comprises obtaining a plurality of initializing parameters. The plurality of initializing parameters originates for example from an entity within the core of the network. Alternatively, the plurality of initializing parameters originates from a computer-readable media internal to the cell.

In yet another variant, the act of scanning the network resources comprises scanning only a subset of all resources associated with a selected network operator.

Alternatively, the act of scanning the network resources comprises scanning all resources which may affect the operation of the cell.

In still another variant, the method further comprises storing a cellular identification of a neighboring base station associated with the at least a portion of occupied cellular network resources identified. The neighboring base station may be designated a default base station for example.

In a second aspect, a method of operating a cell within a cellular network is disclosed.

In one embodiment, the cellular network comprises one or more base stations, and the method comprises: scanning a first frequency range of the cellular network; determining the strongest base station transmission within the cellular network; decoding a signal from at least one of the one or more base stations, the signal indicative of a geographic location; reading data, the data correlating a default frequency range with the geographic location; and determining a power signal from one or more neighboring devices operating within the default frequency range.

In one variant, the first frequency range is determined per a cellular network standard.

In another variant, the method further comprises designating one of the one or more neighboring devices having the greatest power signal as a default neighboring device.

In a further variant, the cell comprises a UMTS femtocell, and the data comprises data stored locally to the femtocell.

In a third aspect of the invention, a femtocell capable of operating within a wireless network is disclosed. In one embodiment, the femtocell comprises: a processing device coupled to a memory; a wireless subsystem; a network interface subsystem in communication with a core portion of the wireless network; and a plurality of executable instructions resident within the memory. When executed by the processing device, the instructions perform the method comprising: initiating a scan via the wireless subsystem to determine wireless network resources; identifying at least a portion of unoccupied wireless network resources from the core portion via the network interface subsystem; receiving a grant message from the core portion granting access to the unoccupied resources; and signaling the wireless subsystem to occupy at least a portion of the un-occupied wireless network resources.

In one variant, the cell comprises a UMTS femtocell, the wireless subsystem comprises a cellular air interface, and the network interface subsystem comprises a wired interface selected from the group consisting of: (i) a DSL modem, (ii) a cable (DOCSIS) modem, and (iii) a T1 line.

In a fourth aspect of the invention, a method of operating a network entity is disclosed. In one embodiment, the network entity is capable of directly or indirectly controlling one or more base stations and one or more femtocells within a wireless network, and the method comprises: allocating network resources to the one or more base stations; receiving a request from at least one of the one or more femtocells, the request seeking permission to utilize at least a portion of the network resources; and granting the request if it is determined that the network resources allocated to the one or more base stations will not be adversely affected by the one or more femtocells utilizing the at least a portion of the network resources.

In one variant, the method further comprises decoding a listing of occupied resources as detected by the one or more femtocells. The wireless network comprises e.g., a cellular network, and the listing of occupied resources comprises one or more cellular entity identification values. The one or more cellular entity identification values are further comprised of in one variant base station cellular entity identification values and femtocell cellular entity identification values, and the method further comprises reading from a memory a listing of allocated resources for the one or more cellular entity identification values.

In another variant, the act of determining that the network resources allocated to the one or more base stations will not be adversely affected by the one or more femtocells utilizing the at least a portion of the network resources is based at least in part on minimizing radio frequency interference (RFI) within the wireless network.

Alternatively, the act of determining that the network resources allocated to the one or more base stations will not be adversely affected by the one or more femtocells utilizing the at least a portion of the network resources is based at least in part on maximizing data throughput within the wireless network.

As yet another alternative, the act of determining that the network resources allocated to the one or more base stations will not be adversely affected by the one or more femtocells utilizing the at least a portion of the network resources is determined based at least in part on providing a predetermined quality of service (QoS) level within the wireless network.

In another variant, the method further comprises denying the request if it is determined that the network resources allocated to the one or more base stations will be adversely affected by the one or more femtocells utilizing the at least a portion of the network resources. The denial comprises for example a denial message, the denial message further comprising a hold-off time indicative of a later period in time when a subsequent request may be sent.

In a fifth aspect of the invention, a method of doing business associated with a wireless network is disclosed. In one embodiment, the network comprises a plurality of substantially fixed base stations, and the method comprises: providing a plurality of substantially portable cells to respective ones of subscribers of the network, the plurality of cells augmenting the coverage of the substantially fixed base stations; allocating network resources to at least one of the base stations; receiving a request from at least one of the cells, the request seeking permission to utilize at least a portion of the network resources; and granting or denying the request based at least in part on an evaluation of one or more profitability or revenue considerations relating to use of the at least portion of the network resources by the at least one base station or the at least one cell.

In a sixth aspect of the invention, a computer readable apparatus comprising a storage medium is disclosed. In one embodiment, the medium comprises a plurality of executable instructions which, when executed by a computer of a network entity capable of directly or indirectly controlling one or more base stations and one or more femtocells within a wireless network, perform the method comprising: allocating network resources to the one or more base stations; receiving a request from at least one of the one or more femtocells, the request seeking permission to utilize at least a portion of the network resources; and granting the request if it is determined that the network resources allocated to the one or more base stations will not be adversely affected by the one or more femtocells utilizing the at least a portion of the network resources.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
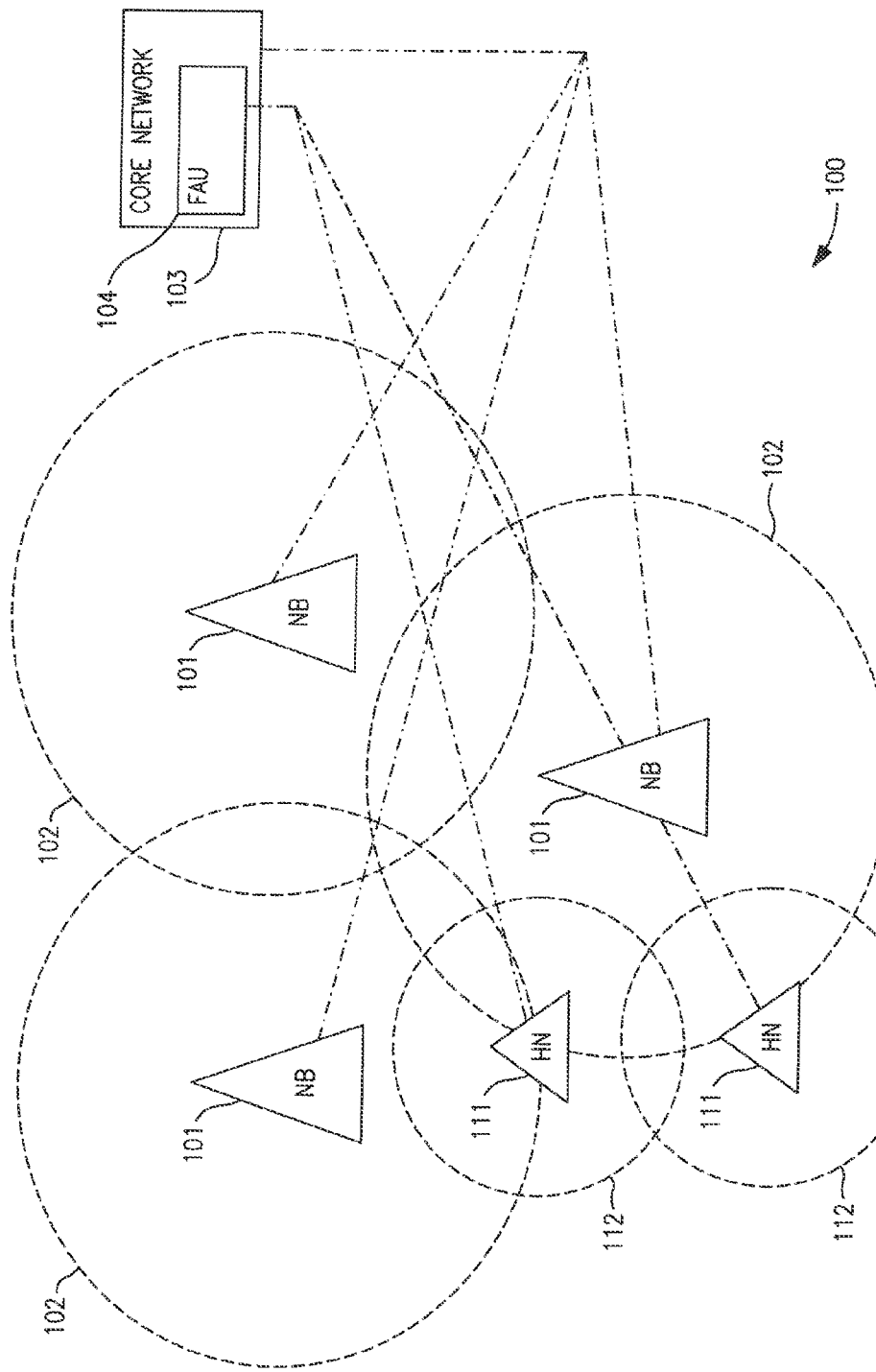
FIG. 1 is a block diagram illustrating a typical prior art UMTS cellular network, comprising Home Node B (HN) deployment within the network.

As used herein, the terms "client device", "end user device" and "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "digital subscriber line" (or "DSL") shall mean any form of DSL configuration or service, whether symmetric or otherwise, including without limitation so-called "G.lite" ADSL (e.g., compliant with ITU G.992.2), RADSL: (rate adaptive DSL), VDSL (very high bit rate DSL), SDSL (symmetric DSL), SHDSL or super-high bit-rate DSL, also known as G.shds1 (e.g., compliant with ITU Recommendation G.991.2, approved by the ITU-T February 2001), HDSL: (high data rate DSL), HDSL2: (2nd generation HDSL), and IDSL (integrated services digital network DSL), as well as In-Premises Phoneline Networks (e.g., HPN).

As used herein, the term "DOCSIS" refers to any of the existing or planned variants of the Data Over Cable Services Interface Specification, including for example DOCSIS versions 1.0, 1.1, 2.0 and 3.0.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), IrDA or other wireless families.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus that enable a femtocell (such as a 3G HNB) to operate in a designated frequency band (e.g., a licensed band) without interfering with neighboring base stations (e.g., 3G Node Bs) or femtocells, or alternatively being interfered with by them.

In one exemplary embodiment of the invention, the femtocell comprises a HNB that has the ability to scan the air interface in a manner similar to that associated with a UE. The HNB scans for signals from neighboring Node Bs and HNBs (e.g., broadcasted system information, reference or synchronization signals, etc.) to determine the occupied frequency ranges in the intended service area. In one variant of the exemplary embodiment, the frequency range to scan is limited by the HNB based on pre-configuration and the current position of the HNB. In a UMTS system, the current position may be determined by decoding the broadcasted system information of surrounding Node Bs or HNBs. Therefore the HNB may have the ability to obtain location information (e.g., the ability to read the Mobile Country Code) from the broadcasted system information of nearby Node Bs or HNBs.

In an alternate method, the HNB may obtain location information via its broadband connection, or yet another local or remote mechanism such as a GPS receiver, or even triangulation with known base stations.

Information generated by the aforementioned scanning procedure is formatted and/or translated, and transferred to a network (e.g., the Core Network of a UMTS system) as input for an allocation entity. This entity (e.g., a frequency allocation unit or FAU) determines the frequency range acceptable for use by the HNB based on the scanned information. The scanned information may comprise for example a listing or translatable representation of unavailable resources. For instance, the scanned information may comprise a listing of unavailable frequencies, or occupied frequency bands. In a UMTS system, the scanned information may also be represented as occupied cell IDs.

In one variant of the invention, a first phase is utilized wherein information about the country where the device is located is gathered. This information is used to determine/limit the frequency regions to scan for occupation, and to advantageously enable operation in different countries. In a second phase, the measurement results from the first phase are reported to the core network (e.g., FAU), which decides about the resources which should be used by the HNB, and which transmits the appropriate parameters to the HNB.

In one embodiment, a centralized FAU is used to provide inter alia unified management of network resources. A messaging system for communication between the FAU and HNBs is disclosed. The message system comprises a mechanism for issuing a request for resources, a report on unavailable resources, and an assignment of resource(s). Furthermore, a method for storing to and reading from computer-readable medium (e.g., a hard-disk drive or other mass storage device of the HNB or network entity) is disclosed, where the medium contains a correlation between known cells (e.g., Node Bs and HNBs cell IDs) and occupied resources.

A setup procedure for the femtocell is also disclosed. In one embodiment, this procedure comprises an initial scan, request for resources, and a subsequent assignment of resources. In one exemplary variant, the HNB powers on or is otherwise initialized (e.g., rebooted), and performs an initial scan. A request for a radio resource and the results of this initial scan are communicated to the FAU. The FAU assigns the HNB a frequency resource based on, among other things, the results of the HNB's scan. Moreover, this setup procedure may be simplified, if the conditions remain unchanged after the HNB is switched off and subsequently switched back on another time, as it is unnecessary to obtain location information.

Detailed Description of Exemplary Embodiments

Exemplary embodiments of the present invention are now described in detail. While these embodiments are primarily discussed in the context of an HNB operating within a UMTS network, it will be recognized by those of ordinary skill that the present invention is not so limited. Moreover, while discussed primarily in the context of communication between a HNB and a dedicated FAU resident to the network operator, it is recognized that other implementations of mobile base station functionality or spectrum management functionality could be implemented at other points within the network without departing from the spirit and scope of the present invention.

Network Architecture

As is well known, a cellular radio system comprises a network of radio cells each served by a transmitting station, known as a cell site or base station. The radio network provides wireless communications service for a plurality of transceivers (in most cases mobile transceivers such as cellular telephones or "smartphones"). The network of base stations working in collaboration allows for substantially seamless wireless service which is greater than the radio coverage provided by a single serving base station. The individual base stations are connected by another network (in many cases a wired or millimeter wave network), which includes additional controllers for resource management, and in some cases access to other network systems (e.g., internets such as the Internet) or MANs/WANs.

In a UMTS system, a base station is commonly referred to as a "Node B". The UMTS Terrestrial Radio Access Network (UTRAN) is the collective body of Node Bs along with the UMTS Radio Network Controllers (RNC). The user interfaces to the UTRAN via User Equipment (UE), which in many typical usage cases comprises the aforementioned cellular phone or smartphone. FIG. 1 illustrates an exemplary UMTS cellular system 100. The UMTS system 100 comprises a plurality of base stations 101 (Node Bs) that are set at various fixed geographic locations. Each of these base stations 101 are characterized by their respective wireless coverage areas 102. A centralized management facility (i.e., the "Core Network" 103) generally governs the operation of the base station towers 101. Also depicted in FIG. 1 are HNBs 111, which are not necessarily geographically fixed. These HNBs 111 create wireless coverage areas 112 that may overlap with those of other HNBs or Node Bs, as shown. Each of the HNBs 111 is in data communication with the FAU 104, which is part of the Core Network 103, via an interface such as a broadband connection (e.g., DSL, DOCSIS cable modem, MoCA interface, or even WiFi or WiMAX wireless interface). For simplification, only the FAU 104 entity is explicitly shown in the Core Network 103, but nevertheless the HNBs 111 are typically connected to other entities located in the Core Network 103 as well.

Figure 1A:
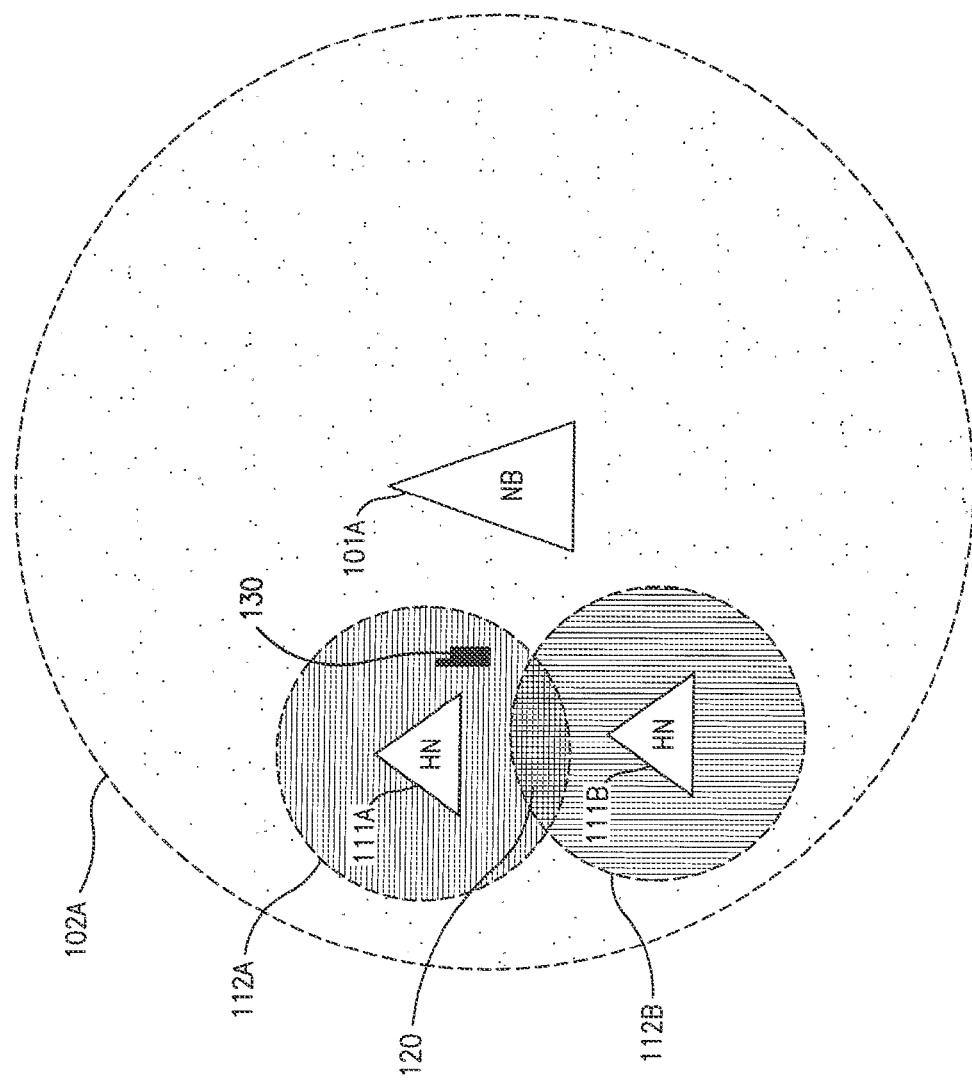
FIG. 1A is a simplified diagram of a typical prior art UMTS cellular network cell comprising Home Node B deployment within the network cell.

FIG. 1A is a simplified diagram of a UMTS Cellular System illustrating an exemplary Node B 101A that has a coverage area 102A. Exemplary Home Node B 111A has a coverage area 112A which is surrounded by or subsumed within the coverage area of Node B 102A, and neighbored by another Home Node B 111B having its own coverage area 112B. Node B 101A transmits system information periodically or continuously; e.g. the cell ID. Also, the neighboring Home Node B 111B transmits its corresponding system information in similar fashion. As shown in FIG. 1A, the entirety of Home Node B's 111A coverage area 112A, lies within the coverage area of Node B 102A. Furthermore, a portion 120 of the coverage area 112A overlaps with the coverage area 112B of the other HNB, as shown.

In this exemplary usage scenario, without proper spectrum management techniques, the addition of Home Node B 111A will mutually interfere with one or more of Node B 101A and the other HNB 111B.

As previously stated, in the exemplary context of UMTS, one requirement of operation is that the spectrum usage must always remain under the control of the operator who owns the licensed spectrum band. To satisfy this requirement, the FAU entity 104 within the Core Network 103 is responsible for managing radio resources. Because of the unpredictable and non-linear nature of the radio environment, a centralized entity will not have the complete information necessary to most efficiently assign radio resources. Therefore, the presently disclosed system comprises a centralized FAU 104 working with HNBs 111 that can scan, as well as report on, their radio environment. The FAU and HNBs utilize in one embodiment a request-grant type protocol for allocating radio resources, although it will be appreciated that other protocols or access/allocation schemes may be used. Accordingly, the architectures shown in FIGS. 1 and 1A ensure that the network operator has ultimate control over spectrum allocation, while still being able to adjust for the HNB localized radio environment.

Methods

Figure 2:
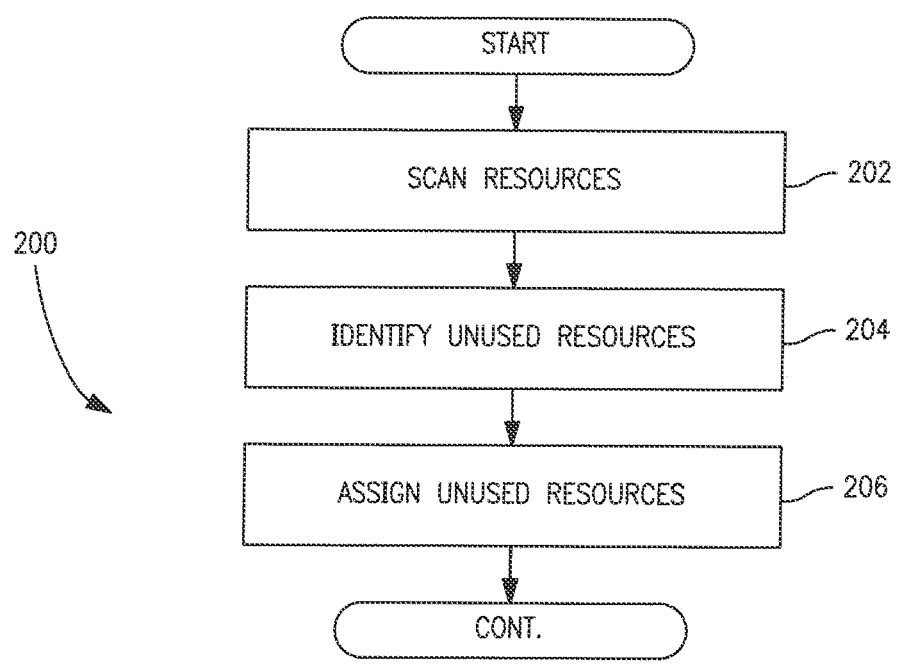
FIG. 2 is a logical flow diagram illustrating one embodiment of a generalized methodology for radio resource setup in accordance with the principles of the present invention.

Referring now to FIG. 2, a generalized setup procedure for allocating network resources for a network entity in communication with a femtocell is illustrated.

As shown in FIG. 2, the exemplary method 200 comprises the femtocell(s) in question first scanning known resources (step 202) in order to identify those that are unused or available. Once these unused resources have been identified (step 204), they are assigned to the femtocell(s) in question per step 206.

Figure 2A:
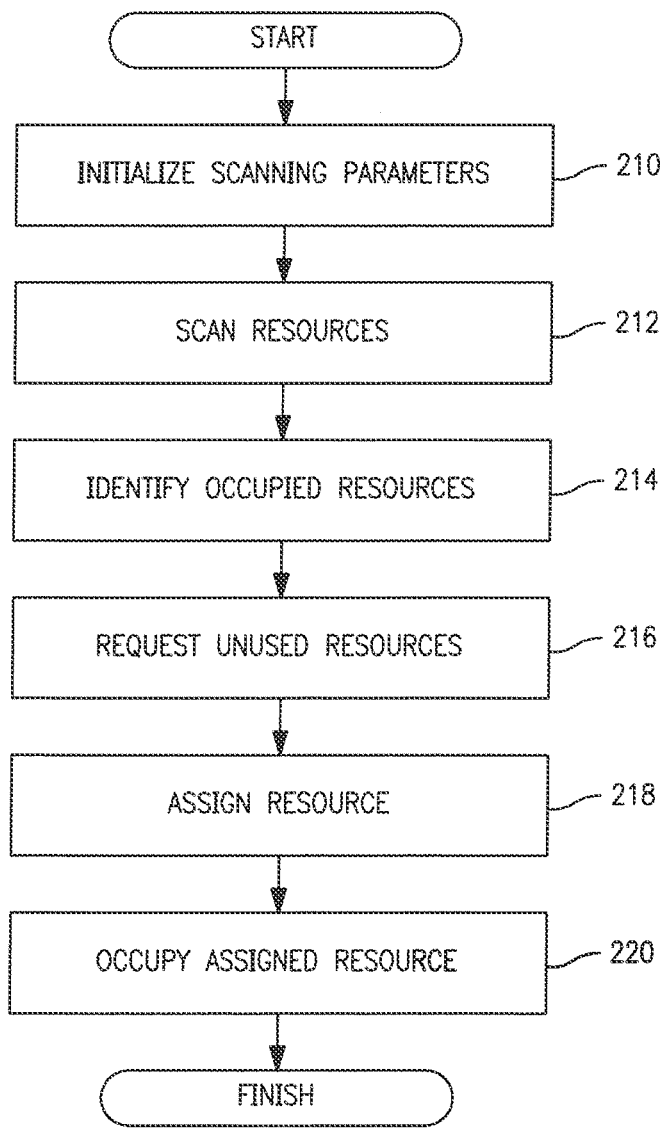
FIG. 2A is a logical flow diagram illustrating one implementation of the methodology of FIG. 2, in the context of a 3G Home Node B system.

Referring now to FIG. 2A, one exemplary implementation of the generalized methodology of FIG. 2 (in the context of a 3G Home Node B) is described.

The femtocell is first powered on and internal settings within the femtocell are initialized. The initialization of internal settings may generally include booting the software, as well as any resetting of hardware settings within the femtocell itself. During initialization, the femtocell also establishes a network connection with the network entity. This may comprise negotiating and establishing a connection over the access medium of choice; e.g., DSL over copper wire, FIOS, cable modem, etc. Upon establishing the network connection, the femtocell notifies the network entity of its presence and optionally its operational status. In order to perform this step, one embodiment of the femtocell retrieves from a computer-readable media (e.g., HDD, ROM or flash memory) the address and protocol for connecting to the network entity. In one variant, this comprises use of a TCP/IP transport over the aforementioned access medium, although other transports and protocols may be used with equal success.

At step 210, the femtocell obtains any parameters which it requires to initiate a scan of the resources. The parameters may originate from either the (remote) network entity, or alternatively may be retrieved internally from computer-readable media (e.g., file, look-up table, etc.) present within the femtocell itself. In other embodiments, a combination of entities could be used to initialize the scanning parameters (e.g., receiving location identification from the network entity as well as looking up scan parameters from an internal memory local to the femtocell). In the exemplary embodiment, similar to UMTS UE operation, these parameters are located locally to the femtocell and are read from a computer readable media.

Figure 2B:
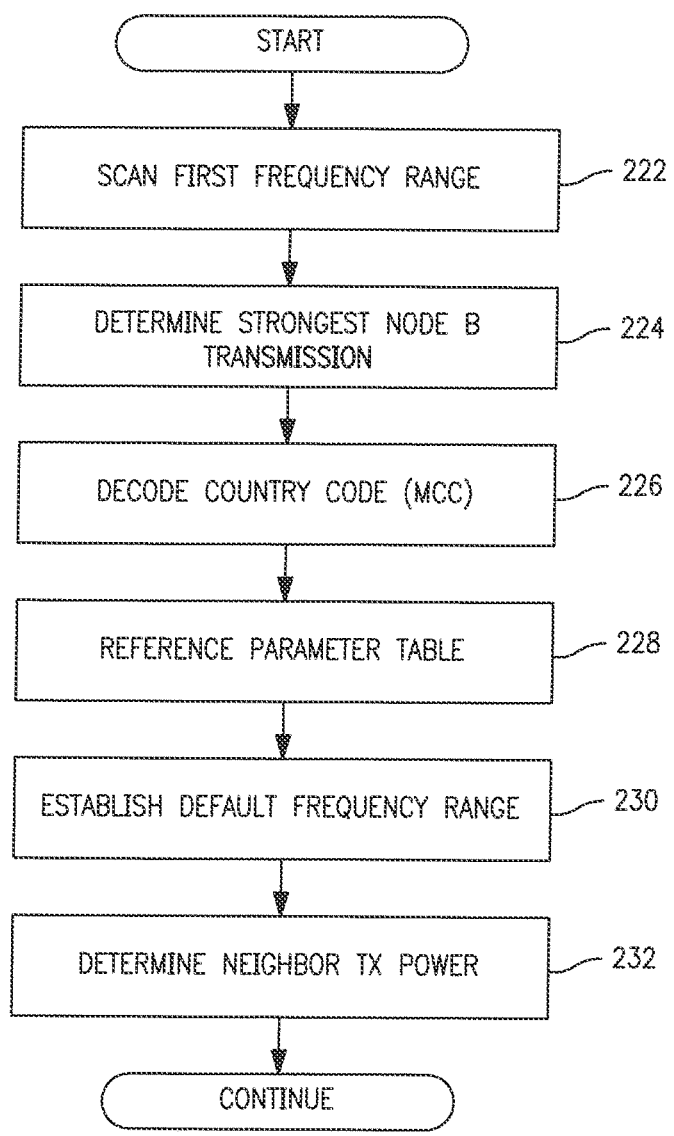
FIG. 2B is a logical flow diagram illustrating an exemplary methodology for the scanning of network radio resources in accordance with the principles of the present invention.

At step 212, the femtocell scans resources based on its initial scan parameters in order to determine currently occupied resources. In the scan, the femtocell may scan only a subset of all resources (e.g., only the resources used by a preferred network operator, portion of a network, portion of the resource "space" such as a fraction of a frequency spectrum, a certain frequency range at a certain time instance with a certain spreading code, etc.), or may perform a full scan of all resources which may affect femtocell operation. For a UMTS system, the scanning procedure is preferably separated into multiple stages, as is best illustrated in FIG. 2B. At step 222 of FIG. 2B, the femtocell begins scanning a first frequency range; e.g., corresponding to the UMTS standard. After determining the strongest base station transmission at 224, the femtocell decodes the mobile country code at step 226. At step 228, the femtocell uses the mobile country code to reference an internally stored table, and then establishes a default frequency range for future scans at step 230. At step 232, the femtocell uses the default frequency range to determine the received power of all neighboring femtocells and base stations, optionally with a preference to a given service provider.

At step 214 (FIG. 2A), the femtocell identifies the occupied resources and determines what unused (or under-utilized) resources are available for the femtocell. Each neighboring base station or femtocell which has a received power (as measured by the femtocell or its proxy) greater than a specified threshold is identified by that femtocell. In one embodiment, the corresponding Cell IDs for such cells are utilized as an identifier. In one variant of the foregoing methodology, the base station with the greatest received power level is stored (via e.g., its Cell ID) as a default base station. This default base station designation will be useful in, inter alia, later initialization sequences to determine if the femtocell has changed locations (recall that base stations are fixed geographically, whereas femtocells are not so constrained).

Next, at step 216, the femtocell issues a request for an unused resource from the network entity. In one embodiment, the femtocell transmits a list of one or more Cell IDs to the network entity using the aforementioned network connection. The network entity can then use the localized information provided by the femtocell as an input to resource assignment. Other schemes may be used as well.

At step 218, the network entity assigns a resource to the femtocell. During this step, other necessary control modifications for setup may be required. For instance, the network entity may explicitly signal parameters for the femtocell to be used thereby (e.g., carrier frequency, spreading or access code, bandwidth and Cell ID, etc.).

At step 220, the femtocell uses the parameters from the network entity to set up its transceiver. In a UMTS system, this process includes broadcasting control channel data, and monitoring the receiver for incoming connection requests.

UMTS System Methods

Figure 3:
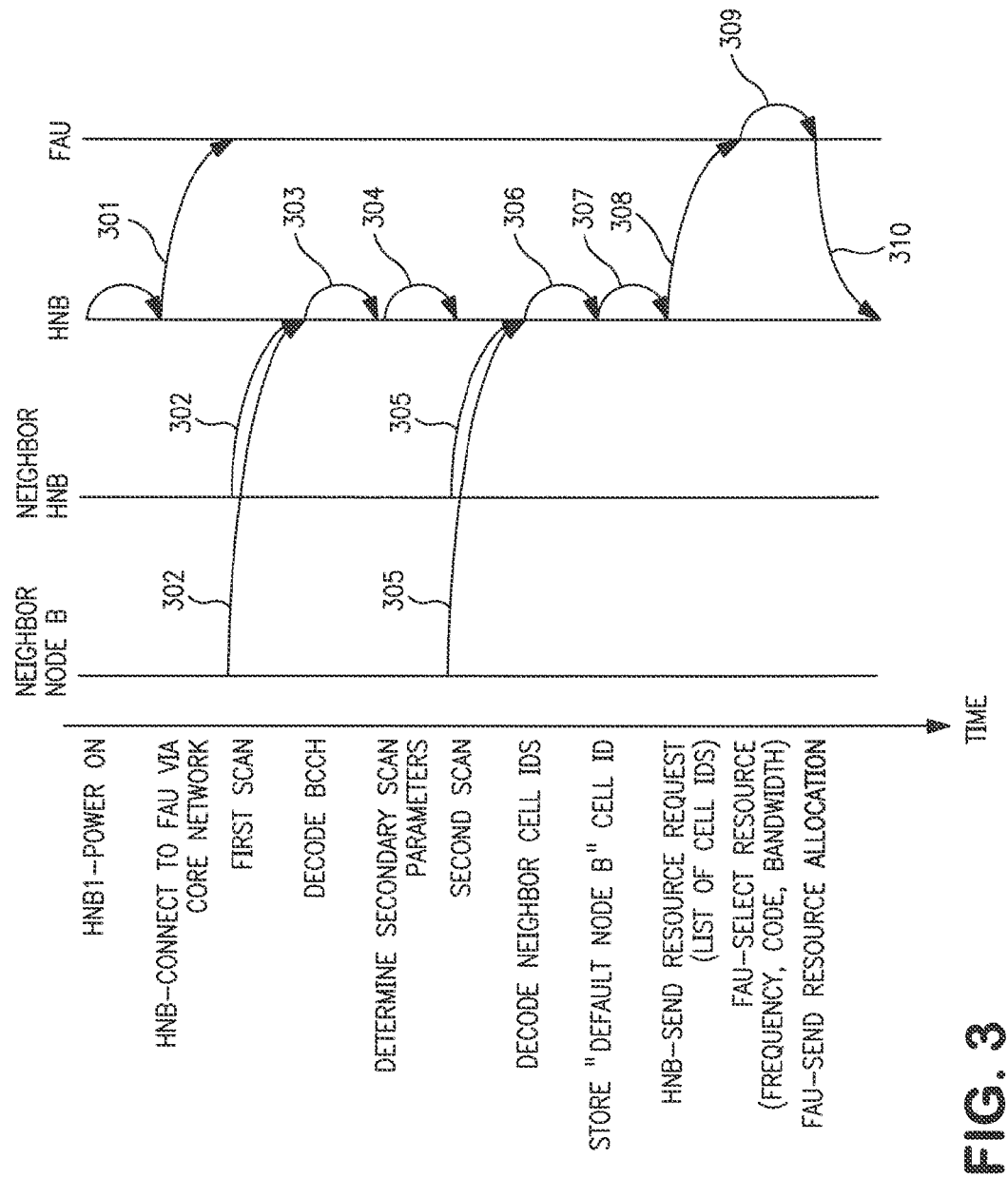
FIG. 3 is a graphical illustration of an exemplary RF setup procedure for a UMTS cellular network HNB according to one embodiment of the present invention.
Figure 3A:
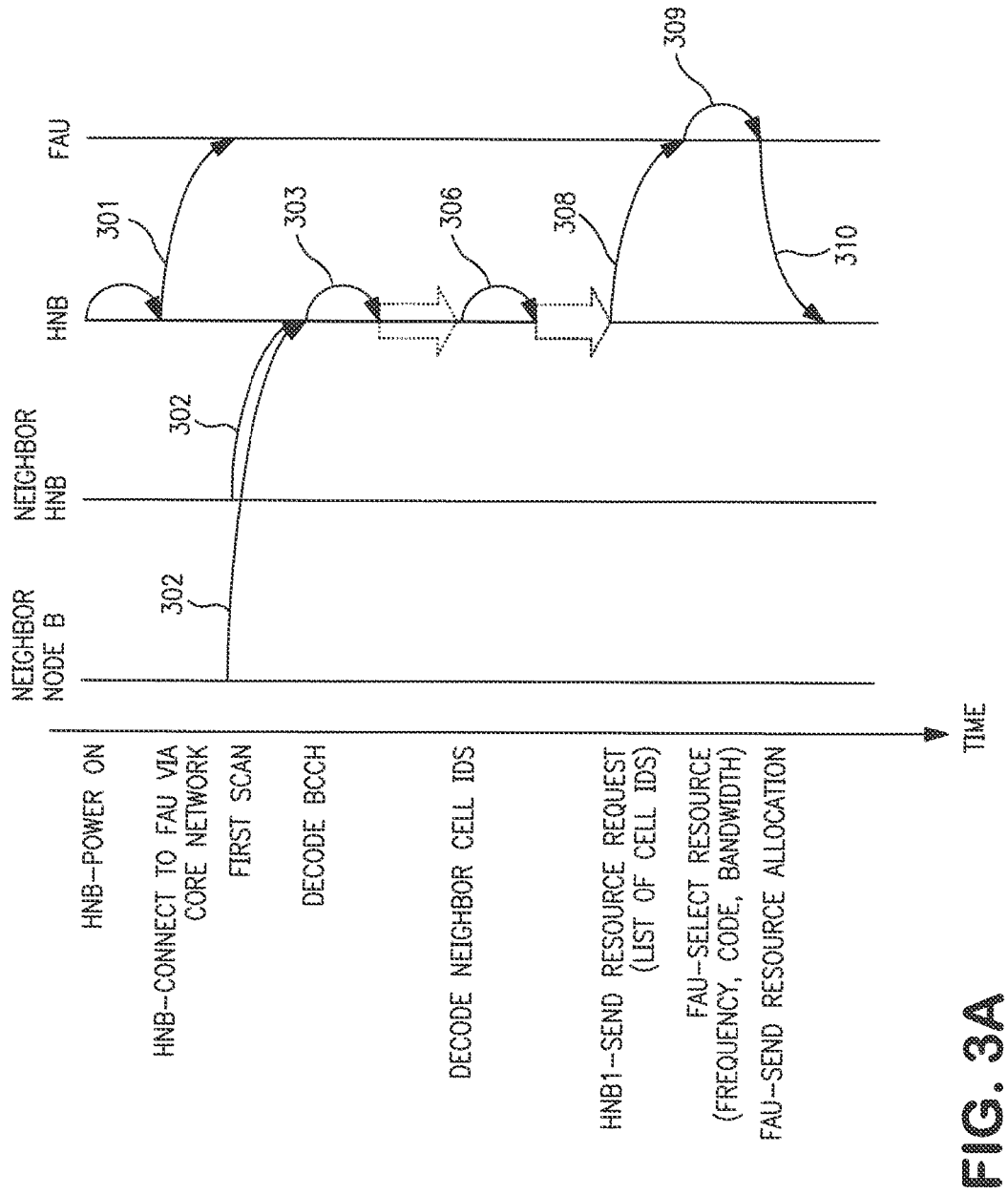
FIG. 3A illustrates an exemplary simplified RF setup procedure for a UMTS cellular network HNB in accordance with the principles of the present invention.

Referring now to FIG. 3, the steps of the methodology of FIGS. 2-2A are described in terms of an exemplary sequence of UMTS-specific steps. FIG. 3A illustrates a simplified version of the setup procedure of FIG. 3.

At step 301, the HNB 111A (see FIG. 1A) is switched on, and establishes a secure connection to the Core Network 103, via a wired broadband based access.

When an HNB powers on, a security procedure is automatically executed for the HNB to correctly operate within the cellular network. Some minimal requirements are imposed, comprising IP security, authentication, and authorization. IP security must be established for bearer traffic to be carried over an untrusted or public network such as the Internet. Authentication and registration with the Core Network ensure that the HNB is a valid device. Lastly, the HNB must be authorized to provide service through the service provider. It will be appreciated that other security measures known to those of ordinary skill in the art may be employed as well including e.g., encryption of all or a portion of the data being transmitted so as to protect data confidentiality, and cryptographic residue (hash) generation to provide integrity protection.

In one exemplary embodiment, the secondary (e.g., wired) interface is implemented as a DSL connection, although any interface providing access to the Core Network control entities could be used, such as e.g., a DOCSIS cable modem, T1 line, wireless interface (e.g., WiMAX or WiFi), Ethernet (802.3), and so forth. The interface uses a standard TCP/IP transport/network layer scheme across the connection to access the Core Network. Furthermore, the UMTS standard defines protocols that guarantee secure transport of signaling and user traffic over IP. The messaging involved for authentication comprises the HNB sending a request for access to the Core Network. This request may include a form of identification and/or proof of identification, in the form of username and password or security certificate (e.g., digital signature) provided by the HNB. After the exchange of authentication information (the HNB must also verify the Core Network is legitimate), the Core Network registers the presence of the HNB.

At step 302, the HNB 111A scans the designated (e.g., UMTS-designated) frequency band to identify nearby cells using its last known parameters. In a UMTS system, the Broadcast Control Channel (BCCH) is broadcast constantly from the base station 101. The BCCH is a unidirectional channel which carries information necessary for identifying and initiating a communication channel to the base station. The BCCH transmit power is constant, but environmental factors may affect signal reception (RF interference, geography, weather-induced or Rayleigh fading, etc.). Therefore, received signal strength of the BCCH can be used as a rough estimation of proximity. Parameters that are transmitted on a UMTS BCCH may comprise: a listing of frequencies, cell ID, power control and discontinuous transmission (DTX) information. Also, the Public Land Mobile Network ID (PLMN) to which that cell belongs is encapsulated in the system information transmitted on the BCCH. The PLMN ID is a concatenation of the Mobile Country Code (MCC) with the Mobile Network Code (MNC) and Location Area Identity (LAI), although it will be recognized that these protocols are merely exemplary in nature, and others may be used consistent with the invention.

During this step 302, the HNB 111A scans for broadcast control channels of any surrounding cellular stations; the HNB uses internally stored parameters for carrier frequency, codes and bandwidth based on the last known location (MCC). If no carrier is found using this focused or "intelligent" approach, the HNB must in effect perform a "brute force" search with broader parameter searches until it finds a BCCH signal which meets the signal to noise (SNR) ratio threshold requirement.

At step 303, the HNB 111A decodes the BCCH of the strongest cell located. After decoding the strongest Node B's Mobile Country Code, the HNB can derive preferred parameters for its home operator (or roaming operator), using the aforementioned parameter lookup table. The Cell ID of the transmitting base station 101A is also encapsulated within the BCCH.

If the parameters of the current MCC differ from the last known parameters, then the HNB 111A assumes that its location has changed. The HNB proceeds to step 304, to initiate a rescan of broadcast control channels.

If the BCCH decode of the strongest cell yields a different Cell ID from the "Default Cell ID", then the HNB 111A assumes that its location has changed, and must proceed to step 304.

If the BCCH decode of the strongest cell yields a Cell ID which matches the "Default Cell ID", then the HNB 111A assumes that its location has not changed. The HNB proceeds to step 306. At this point, a simplified procedure may be followed (the HNB has determined that it has not moved). One exemplary embodiment of such a simplified procedure is illustrated in FIG. 3A.

At step 304, the HNB 111A has determined that its location has changed. The HNB updates its parameters using the current MCC to reference a parameter lookup table.

At step 305, the HNB 111A performs a "clean" scan for broadcast control channels of any surrounding cellular stations, using the updated parameters for carrier frequency, codes and bandwidth based on the new known location (MCC).

At step 306, the HNB 111A decodes all received Cell IDs of neighboring HNBs 111B and Node Bs 101A. If the strongest Cell ID matched the "Default Cell ID", then the HNB proceeds to store the updated Cell IDs of all other neighboring cells (e.g., to a computer readable media such as a HDD or memory), and continues to step 308. If the strongest Cell ID did not match the "Default Cell ID", then the HNB proceeds to step 307.

At step 307, the HNB 111A stores the strongest Cell ID found to a variable "Default Cell ID". Additional parameters referenced by the "Default Cell ID" may also be stored for use in the initial power up sequence. One exemplary case of an additional stored referenced parameter is "Default Frequency Range".

At step 308, the HNB 111A transmits a request for radio resource to the FAU 104, via the Core Network 103. The message RESOURCE_REQ includes a listing of cell IDs of neighboring stations, identified in step 306. In another embodiment, to maintain compatibility with other systems, the RESOURCE_REQ message may be separated into two or more separate messages; e.g., one for a resource request, and another message detailing the list of cell IDs detected. The FAU may or may not send an acknowledgement.

At step 309, the FAU 104 selects a resource for assignment to the requesting HNB. One embodiment of the selection process is described in greater detail below.

At step 310, the FAU 104 transmits a grant for radio resource. The message RESOURCE_GRANT includes an assignment of resources, comprising carrier frequency, code, bandwidth, and cell ID. In another embodiment, to maintain compatibility with other systems, the RESOURCE_GRANT message may be separated into a plurality of separate messages. The HNB 111A may or may not send acknowledgement.

At steps 303 and 306, the HNB 111A behavior is triggered by the strongest Cell ID found. In some embodiments, the HNB may decode a plurality of the Node B Cell IDs, so as to minimize "false" triggering, when the HNB is located on overlapping cell boundaries. In a variant of this plural Cell ID trigger, signal strength for each corresponding permanent Node B fixture is also recorded, along with Cell ID at step 307.

While the aforementioned steps are discussed in an initial scan, single resource request-and-grant method, a similar method may be used whereby the HNB 111A may request a resource multiple times. In one such case, the HNB may request a resource, but the FAU does not assign a resource due to network burden or other prevailing operation or business-related condition. In this case, a hold-off time and denial would be returned with a RESOURCE DNY command. The HNB would then hold off for a specified time before re-requesting a radio resource; this type of resource and grant may or may not necessitate re-initiating a radio frequency scan. The hold-off interval need not be deterministic; for example, a (pseudo)randomized back-off value may be generated for each such message; that way, multiple HNBs requesting resources would back off for random periods of time, thereby avoiding collisions or inundating the FAU with simultaneous requests. Myriad other back-off/multiple access schemes will also be recognized given the present disclosure.

In another such embodiment, scanning of radio frequency could occur multiple times. In this embodiment, a "super" HNB may control two or more resources. Such a super HNB could poll for resources. For instance, an HNB capable of occupying more than one radio resource could scan radio resources periodically (i.e., polling), and request additional resources when it determines that a neighboring HNB has powered down, and/or vacated a resource. These requests could be either a plurality of separate RESOURCE_REQ requests, or they could be a single RESOURCE_REQ request with an additional field specifying the number of resources requested.

In another variation, scanning of radio frequency could occur based on a message originated at the FAU 104. This FAU initiated scan attempt may be used to reinitiate a previously denied service. For instance, the FAU may log the Cell IDs of surrounding HNBs 111B for an HNB 111A that has been denied service. When a neighboring HNB 111B powers down, the FAU may initiate a radio scan at the previously denied HNB 111A to determine if the HNB 111A can be enabled with the neighboring HNB's 111B recently vacated resource.

Frequency Allocation Unit Operation

Figure 3B:
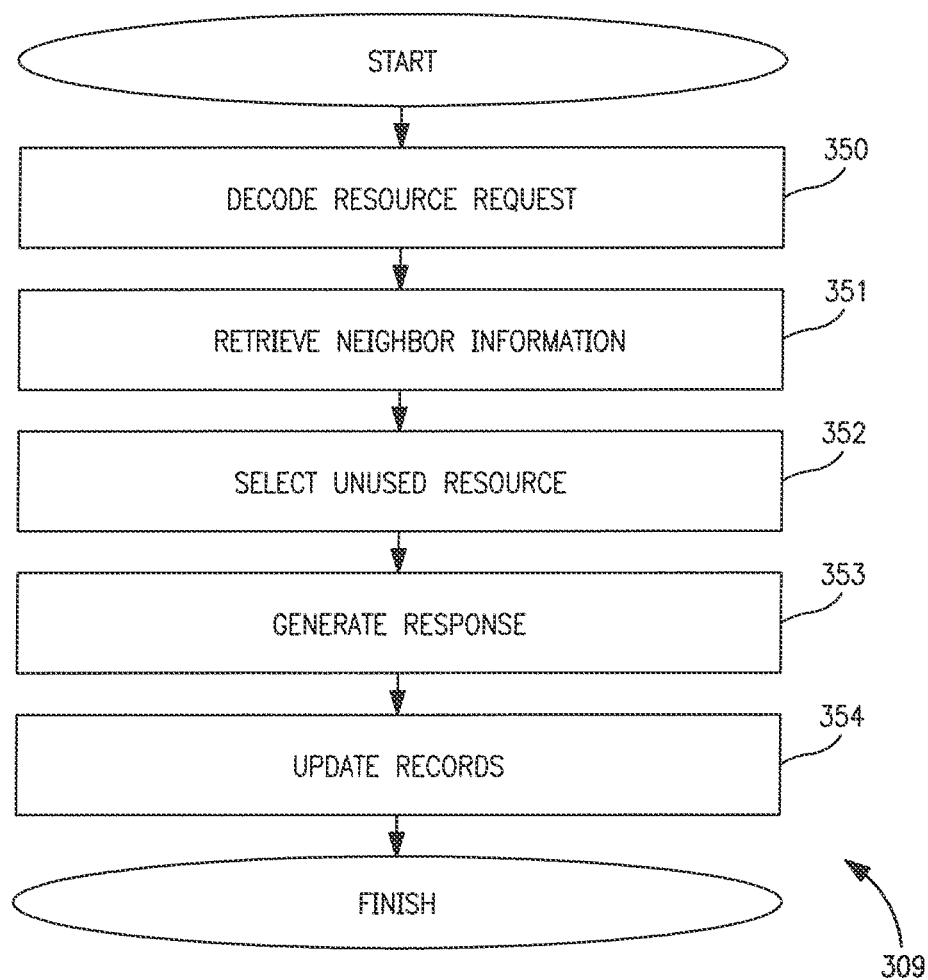
FIG. 3B is a logical flow diagram illustrating one embodiment of a frequency allocation methodology in accordance with the principles of the present invention.

Referring now to FIG. 3B, the operation of the exemplary embodiment of the FAU at step 309 above (FAU radio resource selection process) is now described in greater detail.

At step 350, the FAU 104 has received the request for a radio resource. The FAU 104 decodes the listing of occupied resources as detected by the HNB 111A. In the exemplary UMTS system, this listing comprises a listing of Cell IDs. The listing of decoded Cell IDs is separated into Cell IDs of Node B(s) 101A and Cell IDs of HNB(s) 111B. The Cell IDs of Node B(s) 101A are assumed to be a permanent fixture of the HNB's 111A environment, and will not change. The Cell IDs of neighboring HNB(s) 111B are assumed to be temporary fixtures of the HNB's 111A environment, and may change nomadically, erratically, periodically, or not at all.

At step 351, the FAU 104 retrieves from storage corresponding resources previously assigned to each Cell ID. In a UMTS system, these resources may comprise a listing of bandwidth, frequency bands (channel numbers), code rates, etc.

At step 352, the FAU 104 proceeds to select available radio resources. Several criteria for radio resource selection are available, and are moderated by the network operator. Such criteria may include for example minimizing radio frequency interference, maximizing data rates, minimizing data rates/bandwidth consumption, supporting varying levels of quality of service (QoS) for various users, maintaining certain security requirements, etc. Additionally such criteria may be dependant from the contract between the HNB operator/owner and the operator of the cellular network. For example, a femtocell with a low-budget tariff (e.g., residential) obtains a smaller bandwidth compared to a femtocell with a business tariff for, e.g., an office building. In one example, a limited data pipe shared between Node Bs 101 and HNBs 111 in a region may be preferentially served to Node Bs 101, therefore HNBs 111 may be assigned resources to support high data rates, only during periods of low network usage. In another example, the FAU 104 may determine that a particular Cell ID of a Node B 101 has too many HNBs 111 in its vicinity, the FAU 104 may opt to deny service to additional HNBs 111 which request a frequency in that Node Bs 101 vicinity.

At step 353, the FAU 104 generates a response to the HNB 111. This response may be either a grant of resources, or a denial of resources. In a grant of resources, the HNB 111 is assigned an appropriate cell ID, a frequency band, code, etc. In a denial of service the FAU 104 may simply return a denial, or in another embodiment, the denial message may include a hold-off time, such that the HNB 111 may request access at a scheduled later time.

At step 354, The FAU 104 updates its internal table or other data structure with the new HNBs 111 Cell ID, and radio resources. For an HNB 111 which was denied service, the FAU 104 may opt not to record its entry. The FAU 104 may also record the denied HNB 111 along with a time stamp, or number indicating number of denials (for use in algorithms ensuring fair HNB service). The FAU 104 may also record the denied HNB 111 and any neighboring HNB cell IDs, such that when a neighboring HNB 111 is powered down, the denied HNB 111 may be offered service.

Femtocell Apparatus

Figure 4:
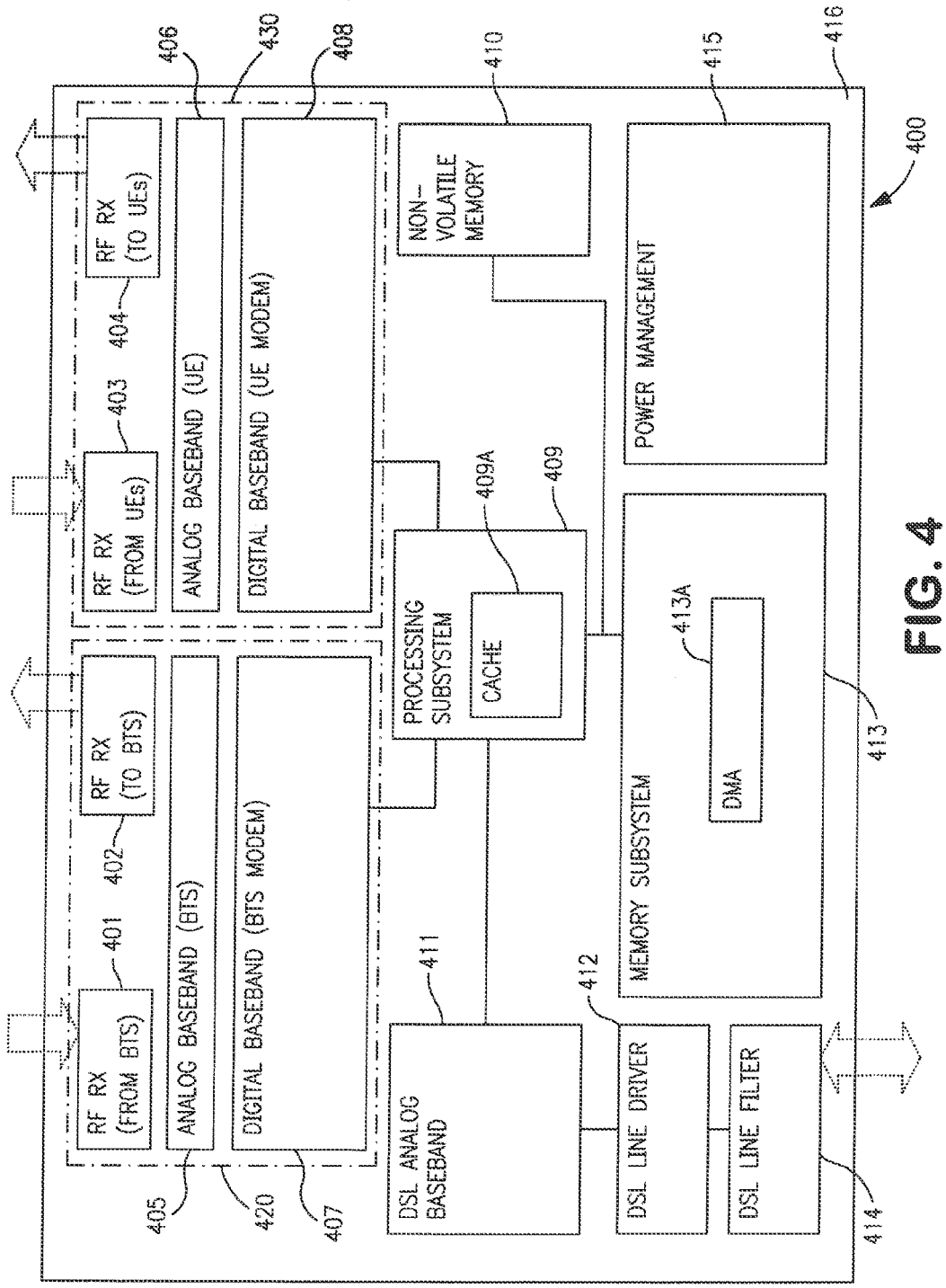
FIG. 4 illustrates an exemplary femtocell apparatus useful for implementing the aforementioned methodologies of the present invention.

Referring now to FIG. 4, exemplary femtocell apparatus 400 useful in implementing the functionality previously described above is illustrated and described. The femtocell apparatus 400 comprises one or more substrate(s) 416 that further include a plurality of integrated circuits including a processing subsystem 409 such as a digital signal processor (DSP), microprocessor, gate array, or plurality of processing components as well as a power management subsystem 415 that provides power to the femtocell 400.

The processing subsystem 409 might comprise in one embodiment an internal cache memory 409A, or a plurality of processors (or a multi-core processor). The processing subsystem 409 is preferably connected to a non-volatile memory 410, as well as a memory subsystem 413. The memory subsystem 413 may implement one or a more of DMA 413A type hardware, so as to facilitate rapid data access.

The exemplary apparatus 400 will, in some embodiments, implement some form of broadband access. In the illustrated embodiment, the broadband access is provided by a DSL connection. Hence, a DSL analog baseband 411, DSL line driver 412 and DSL line filter 414 are shown. The digital portion of DSL processing may either be performed in the processor 409, or alternatively in a separate DSL processor (not shown). Further, while a DSL broadband connection is illustrated, it is recognized by one of ordinary skill that other broadband access schemes such as DOCSIS cable modem, T1 line, etc. could be readily substituted or even used in tandem with the aforementioned DSL interface.

The exemplary apparatus comprises two RF modem subsystems. The BTS modem subsystem 420 enables the femtocell to search neighboring BTS RF transmissions. The UE modem subsystem 430 enables the femtocell to provide service to UEs.

The BTS modem subsystem 420 comprises a digital baseband 407, analog baseband 405, and RF components for RX 401 and TX 402. It is recognized that in some embodiments that it may be desirable to obviate some of the components presently illustrated (such as RF TX 402), or alternatively, the discrete components illustrated may be merged with one another to form a single component (such as merging RF RX 401 and RF TX 402,).

The UE modem subsystem 430 comprises a digital baseband 408, analog baseband 406, and RF components for RX 403 and TX 404. While a single RX 403 TX 404 is illustrated between the exemplary femtocell apparatus 400 and a UE, it is appreciated that multiple UE RF front ends may exist to support multiple simultaneous UEs and air interfaces, or alternatively implement MIMO aspects of operation such as for example that described in co-owned and co-pending U.S. patent application Ser. No. 12/150,485 filed Apr. 28, 2008 entitled "Apparatus and Methods for Transmission and Reception of Data in Multi-Antenna Systems", incorporated herein by reference in its entirety.

In one exemplary implementation, the femtocell apparatus disclosed above further comprises apparatus for scanning for the received signal power of different types of mobile communication systems. Accordingly, the apparatus responsible for detecting signal power (e.g., RSSI) must receive the radio frequency signal and at least partially demodulate neighboring cell broadcasted control channels. In one exemplary embodiment, the femtocell fully demodulates the downlink power signal from the cellular network. Alternatively, for a wireless system which does not require full demodulation to extract the Cell ID, the signals can be demodulated only as far as is required to extract the received Cell ID.

In some wireless networks, pre-configuration data is required in order to complete the demodulation process. In one such exemplary embodiment, this demodulation data is referenced to location identification. In an exemplary embodiment, the femtocell obtains an ID of the country in which the scanned mobile communication system is running (e.g. the mobile country code or MCC) via the wireless interface. Alternatively, in another embodiment, the femtocell selects a set of parameters from a stored table or a hard-coded set of parameters.

The femtocell should also be able to seamlessly operate with a network entity as well as a Core Network. In one such embodiment, the femtocell and network entities are connected via a broadband type access. Such broadband type access allows the Core Network to control licensed spectral usage. Therefore, if the femtocell is unable to operate with the resources specified by the resource allocation message, the femtocell must desist from receiving and transmitting.

FAU Apparatus

Implementation of the frequency allocation unit (FAU) 104 unit may be accomplished in hardware and/or software. The functionality of the FAU 104 may be implemented as a separate entity in the Core Network 103, or the functions may be included in other existing Core Network entities such as a Serving GPRS Support Node (SGSN). In the exemplary embodiment described subsequently herein, the FAU entity is implemented within software embodied in a computer readable medium (e.g., HDD, memory, etc.) and executable by a processing device (e.g. a digital processor, microprocessor, etc.).

The FAU 104 must obtain and/or store a table of currently used resources (e.g. frequency, bandwidth, code, etc.) with the ID of the cell that uses it (e.g. the Cell ID). Other data, specific to a particular HNB 111, but relevant for system management, may also be stored to media for usage by the FAU 104. Furthermore, while the present embodiment suggests the storage of data local to the FAU functionality, it is appreciated that remote storage of the data may be utilized as well.

Furthermore, it is understood that multiple methods for obtaining currently used resources may be utilized. For example these methods may include periodic refresh and reclamation procedures. Reclamation of valuable spectrum may be critical for nomadic femtocell operation where the previously assigned femtocell may experience, e.g. a "dirty" power off sequence.

The FAU 104 must select a free resource within the range of resources assigned for dedicated use by the operator and to consider information from the received resource request (e.g. a requested bandwidth) for this selection. While in an exemplary embodiment, the primary input for resource allocation is from the HNB 111, it is appreciated that other inputs may be necessary and further may override the HNB 111 resource request. In certain circumstances, the FAU 104 may determine that the HNB 111 resource request is to be ignored, and no such resource is allocated to the HNB 111. Such a circumstance may occur due to network burden, business accounting, improper/unsupported hardware, security, etc. Furthermore it is appreciated that the resource pool selected from by the FAU 104 may not be a comprehensive pool of resources (such limitations may be imposed for hardware/software compatibility issues, security issues, business issues etc.).

Business Methods and Rules Engine

It will be recognized that the foregoing network apparatus and methodologies may be readily adapted to various business models. For example, in one such model, a service provider/network operator may provide an enhanced-capability femtocell (such as that described previously herein) to customers willing to pay a premium, or as an incentive for its higher-tier customers.

In another paradigm, certain strategic users could be selected to receive such enhanced-capability femtocells based on inter alia their subscription level, rate of usage, geographic location, etc., even in exchange for consideration from the network operator (e.g., a rebate or reduction of their monthly service fees if they operate the femtocell in accordance with the network provider policies).

The aforementioned network apparatus and methodologies may also be readily adapted for operation in accordance with an underlying business rules "engine". This business rules engine may comprise for example a software application and/or hardware, and is implemented in one embodiment as a separate entity at the Core Network, or alternatively within an existing entity residing at the Core Network or other network management process.

In one embodiment, the business rules engine takes into account the revenue and/or profit implications associated with providing resources to one or more user-operated femtocells so that the resource allocation to the femtocell does not negatively impact network user experience, or the services that are able to be provided to users on the network via the geographically fixed base stations. Accordingly, the exemplary business rules engine can modify the behavior of the system at specific steps described in the methodologies above in order to accomplish one or more economic objectives for the network operator. For instance, in one example, evaluation of the request from a femtocell for resources (e.g., frequency spectrum) may include an analysis of the incremental cost, revenue, and/or profit associated with the various allocation options (i.e., allocation to the requesting femtocell, or denial of the request and allocation to another femtocell, or a static base station). These "business rules" may be imposed e.g., at time of resource request and then maintained for a period of time (or until an event triggering a re-evaluation occurs), or alternatively according to a periodic model. In another variant, the party who owns the resources is tasked with making business-related decisions; i.e., the network operator for the business relationship between the femtocell (owner) and the core network.

As yet another alternative, the femtocell may be equipped with logic (e.g., a business rules engine or component thereof, such as a client portion of a distributed application) that is configured to analyze and make business or operational decisions relating to the business model between the client device (e.g., UE) and the femtocell. For instance, the femtocell may preferentially process or allocate resources to certain requesting users based on their status (e.g., as existing subscribers of the service provider associated with the core network, the type of service requested and revenue/profit implications associated therewith, etc.)

Myriad different schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A non-transitory computer readable apparatus comprising a storage medium having instructions configured to administer a first wireless femtocell, the instructions further configured to, when executed by a computer:
   scan a first frequency range of a cellular network;
   determine a strongest base station transmission within the cellular network;
   decode a mobile country code (MCC) of the base station emitting the strongest base station transmission;
   use the mobile country code to reference a default frequency range for future scans within a specific geographic location; and
   determine a signal power from each of the one or more base stations operating within the default frequency range.

2. The non-transitory computer readable apparatus of claim 1, wherein the first femtocell scans the first frequency range to determine one or more occupied frequency ranges.

3. The non-transitory computer readable apparatus of claim 1, wherein the first frequency range is determined per a cellular network standard.

4. The non-transitory computer readable apparatus of claim 3, wherein the first frequency range corresponds to a frequency range specified in a Universal Mobile Telecommunications System (UMTS) standard.

5. The non-transitory computer readable apparatus of claim 1, wherein the first frequency range is limited by pre-configuration of the femtocell.

6. The non-transitory computer readable apparatus of claim 1, wherein the first frequency range is limited by the specific geographic location of the femtocell.

7. The non-transitory computer readable apparatus of claim 1, further comprising instructions wherein preference is given to a specific service provider when determining the signal power.

8. The non-transitory computer readable apparatus of claim 1, further comprising instructions to designate one of the one or more base stations operating within the default frequency range, having the greatest signal power, as a default base station.

9. The non-transitory computer readable apparatus of claim 1, further comprising instructions wherein data identifying the default base station is stored within the first wireless femtocell.

10. The non-transitory computer readable apparatus of claim 1, further comprising instructions wherein the default base station is used to determine if the first wireless femtocell has changed locations.

11. A method of administering a first wireless femtocell, the method comprising:
scanning a first frequency range of a cellular network;
determining a strongest base station transmission within the cellular network;
decoding a mobile country code (MCC) of the base station emitting the strongest base station transmission;
using the mobile country code to reference a default frequency range for future scans within a specific geographic location; and
determining a signal power from each of the one or more base stations operating within the default frequency range.

12. The method of claim 11, wherein the first femtocell scans the first frequency range to determine one or more occupied frequency ranges.

13. The method of claim 11, wherein the first frequency range is determined per a cellular network standard.

14. The method of claim 13, wherein the first frequency range corresponds to a frequency range specified in a Universal Mobile Telecommunications System (UMTS) standard.

15. The method of claim 11, wherein the first frequency range is limited by pre-configuration of the femtocell.

16. The method of claim 11, wherein the first frequency range is limited by the specific geographic location of the femtocell.

17. The method of claim 11, further comprising giving preference to a specific service provider when determining the signal power.

18. The method of claim 11, further comprising designating one of the one or more base stations operating within the default frequency range, having the greatest signal power, as a default base station.

19. The method of claim 11, further comprising storing data identifying the default base station within the first wireless femtocell.

20. The method of claim 11, further comprising using the default base station to determine if the first wireless femtocell has changed locations.

* * * * *